March 6, 1951 R. G. TESSMER 2,544,402
LIQUID FILTER

Filed Nov. 15, 1947 5 Sheets-Sheet 1

INVENTOR
Raymond G. Tessmer
BY
Beau, Brooks, Buckley & Beau.
ATTORNEYS

March 6, 1951 — R. G. TESSMER — 2,544,402
LIQUID FILTER

Filed Nov. 15, 1947 — 5 Sheets-Sheet 2

INVENTOR
Raymond G. Tessmer
BY Bean, Brooks, Buckley & Bean
ATTORNEYS

March 6, 1951 R. G. TESSMER 2,544,402
LIQUID FILTER
Filed Nov. 15, 1947 5 Sheets-Sheet 3

INVENTOR
Raymond G. Tessmer
BY
Bean, Brooks, Buckley & Bean
ATTORNEYS

March 6, 1951     R. G. TESSMER     2,544,402
LIQUID FILTER

Filed Nov. 15, 1947     5 Sheets-Sheet 4

INVENTOR
Raymond G. Tessmer
BY
Bean, Brooks, Buckley & Bean
ATTORNEYS

March 6, 1951   R. G. TESSMER   2,544,402
LIQUID FILTER
Filed Nov. 15, 1947   5 Sheets-Sheet 5
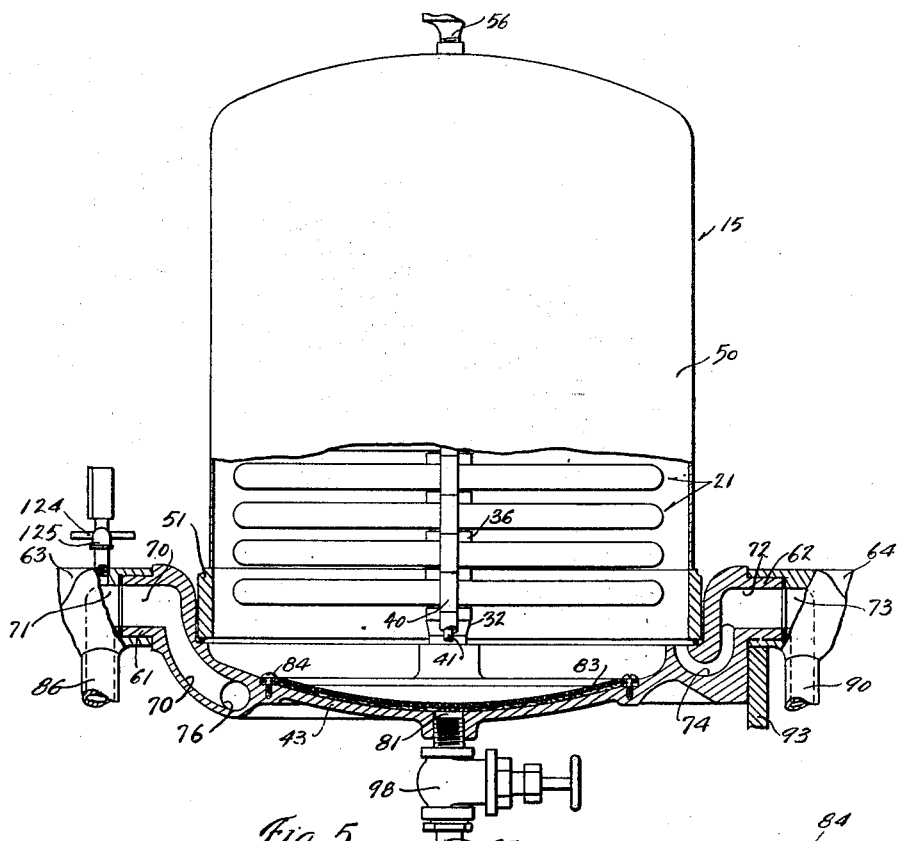
Fig. 5.
Fig. 10.
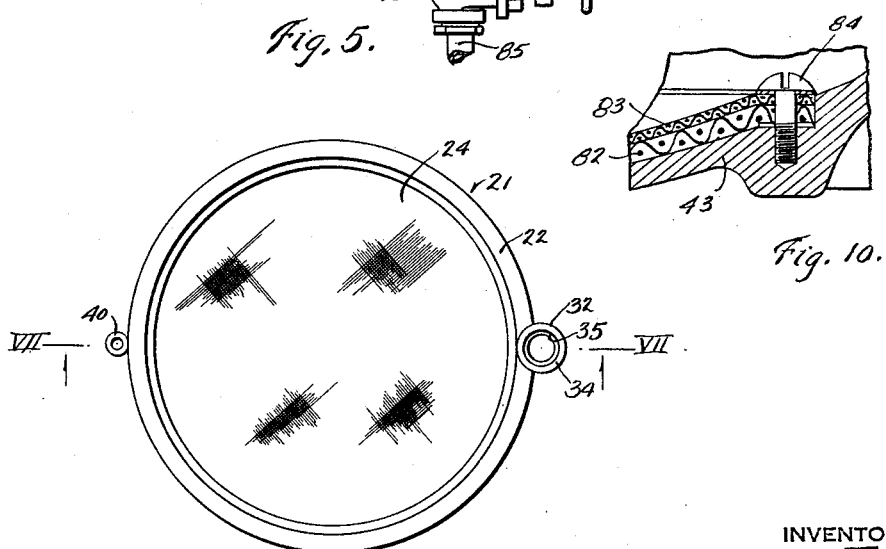
Fig. 6.
INVENTOR
Raymond G. Tessmer
BY
Beau, Brooks, Buckley & Beau
ATTORNEYS Patented Mar. 6, 1951

2,544,402

UNITED STATES PATENT OFFICE 2,544,402

LIQUID FILTER

Raymond G. Tessmer, Tonawanda, N. Y., assignor to Arnold Jacobowitz, Buffalo, N. Y.

Application November 15, 1947, Serial No. 786,244

4 Claims. (Cl. 210—181)

1

My invention relates in general to filtering devices and particularly to a filter of the leaf type which is adapted to the separate collection of clarified liquid and removed solids.

It is well known to those skilled in the art that not many clarification filters of the present day are suitable for the recovery of large percentages of solids and some unfiltered liquid is always left in the tank. Furthermore, such solid recovery filters are difficult to disassemble and since these devices must be cleaned after each cycle of operation, considerable time and effort are consumed.

The principal object of my invention has been to provide a leaf filter which may be operated in either horizontal or vertical position for the recovery of clarified liquids or the collection of solids extracted therefrom. The tilting of the filter elements makes it possible to easily and quickly clean the device, without the necessity of disassembling and removing any of the filtering units.

Another object has been to provide an easily removable dome for the filter whereby the leaves thereof may be readily exposed for cleaning or disassembling purposes.

Another object has been to provide a device which may be tilted to a vertical or horizontal position or to any intermediate position without interrupting the filtering process.

Another object is to provide a filtering device having an additional filter for removing the liquid remaining in the device after the filtering process has been completed.

Another object has been to independently connect the additional filter to the outlet of the device by suitable valved means, provision being made for blowing gas or air under pressure into the device to remove the remaining liquid through the additional filter and to dry the filter cakes.

Moreover, my device is provided with a plurality of filter leaves, each having a hollow channel-shaped frame extending around the periphery for collecting the liquid and thereby providing for minimum fluid travel and an unobstructed flow to the outlet nozzle of the leaf. A further object is to provide a filter leaf having a metal-to-metal seal between the frame and the various metal screens and metal plates.

Furthermore, it is an object to provide each filter leaf with an outlet hub having at its ends oppositely arranged coupling means whereby a series of leaves may be interconnected, the outlet hubs forming, when assembled, an outlet

2 manifold for the device. The outlet hubs form spacers for the leaves and may be varied in length or used interchangeably with blank spacers to alter the distance between adjacent filter leaves.

A still further object of the invention is to provide a leaf spacer on each filter leaf at a point substantially diametrically opposite the outlet hub, whereby the leaves may be supported by the passage of a rod through the spacers.

Furthermore, it has been an object to provide rods passing through the assembled outlets and the spacers, whereby the filter leaves may be easily and conveniently fastened in position.

The above objects and advantages have been accomplished by the devices shown in the accompanying drawings, of which:

Fig. 5 is a fragmentary sectional view taken on line V—V of Fig. 3;

Fig. 6 is a plan view of one of the filtering leaves of my device;

Fig. 10 is an enlarged fragmentary sectional view taken on line X—X of Fig. 3.

Figure 1:
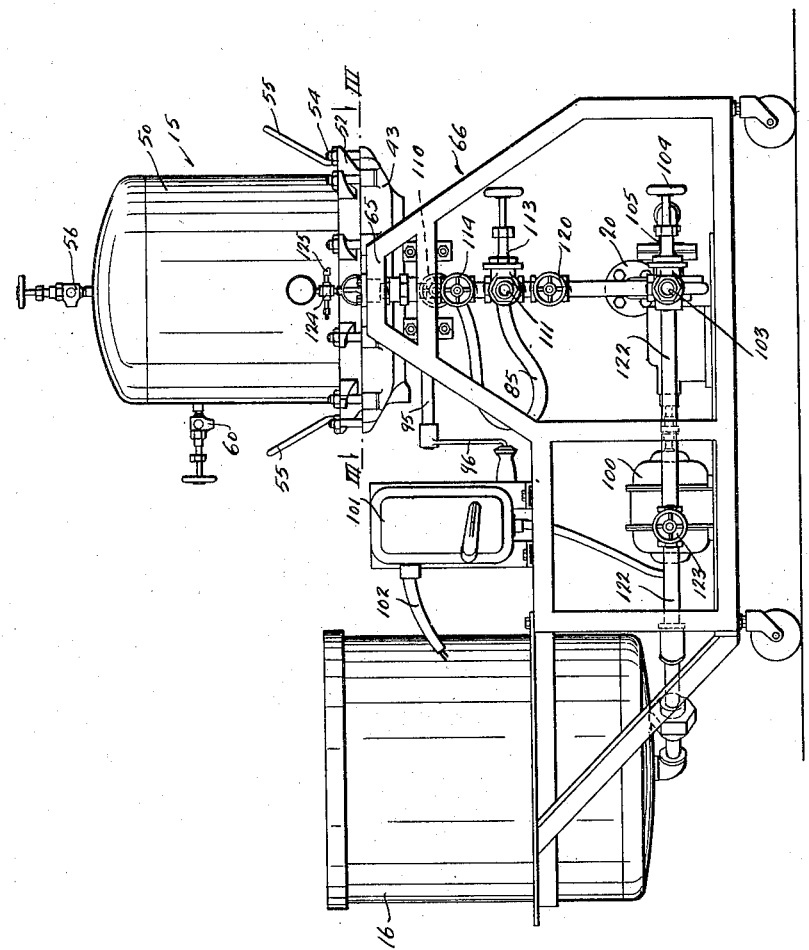
Fig. 1 is a side elevation of my complete device.
Figure 2:
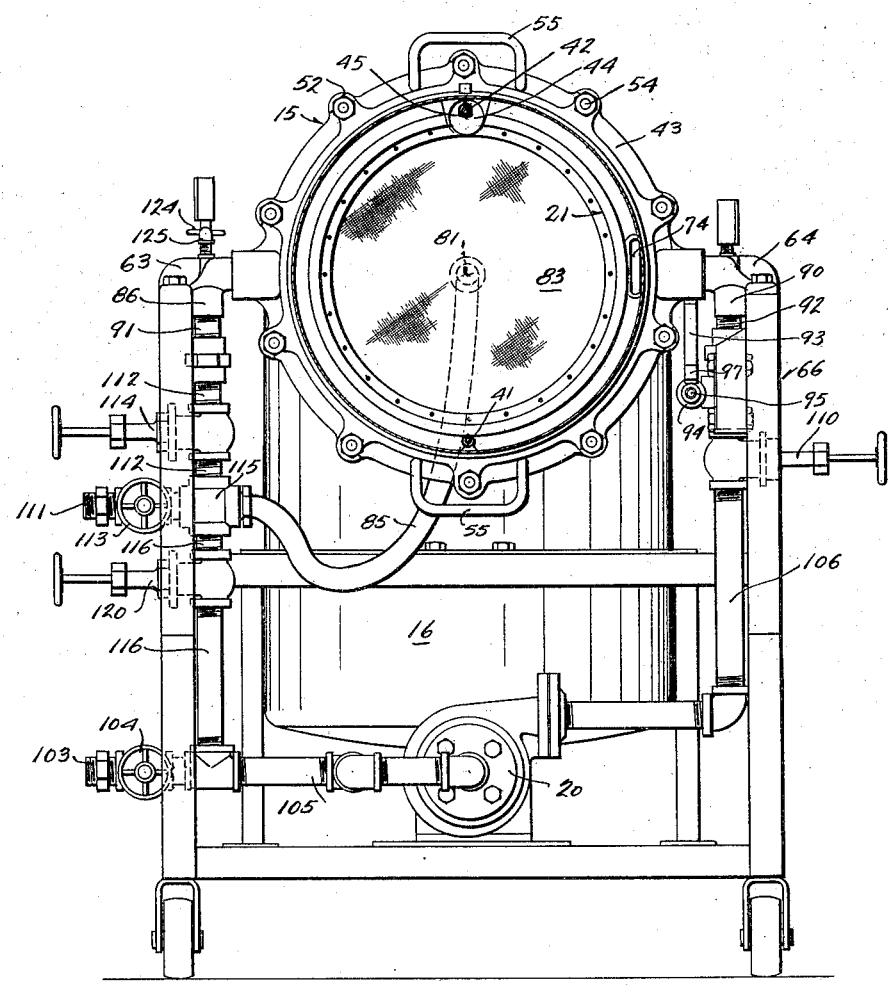
Fig. 2 is an end elevation of the device with the filtering unit tipped in horizontal position and the dome in section.
Figure 3:
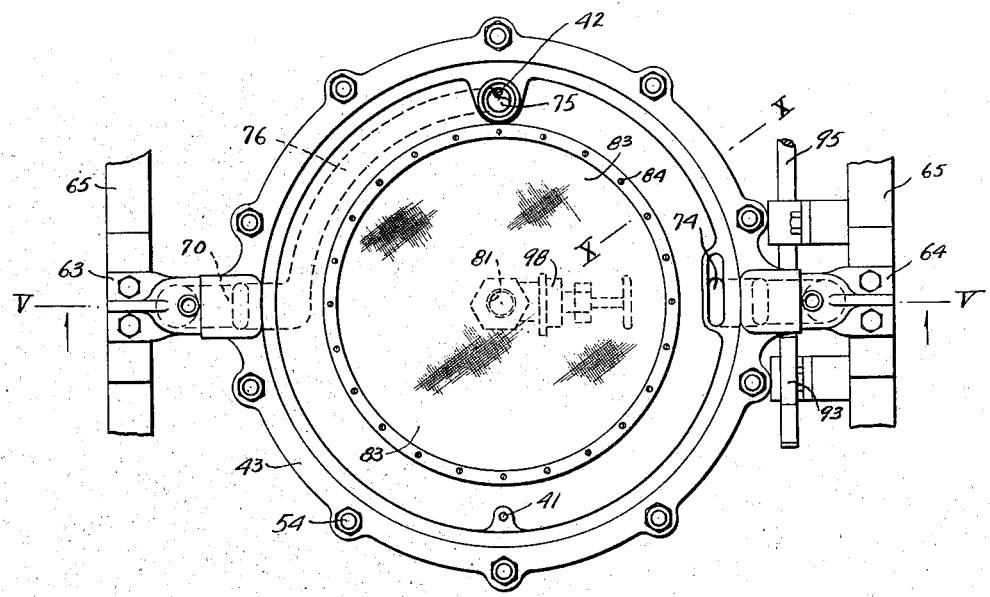
Fig. 3 is a fragmentary sectional view taken on III—III of Fig. 1 showing the filter leaves removed.
Figure 7:
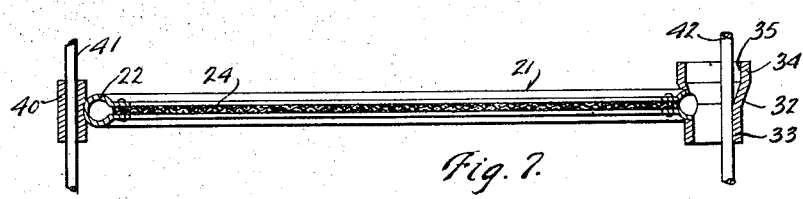
Fig. 7 is an enlarged side sectional elevation of one of the filtering leaves taken on line VII—VII of Fig. 6, showing the leaf support rod and leaf guide rod extending therethrough.

As shown in Fig. 1, my device comprises in general a filter 15, and a supply mix tank 16 connected together by means of a liquid pump 20 and suitable piping, to be hereinafter described.

The filter 15 is provided with a plurality of leaves 21 which are arranged adjacent to each other with spaces provided between them for the passage of liquid and the collection of the solids.

Figures 4, 11:
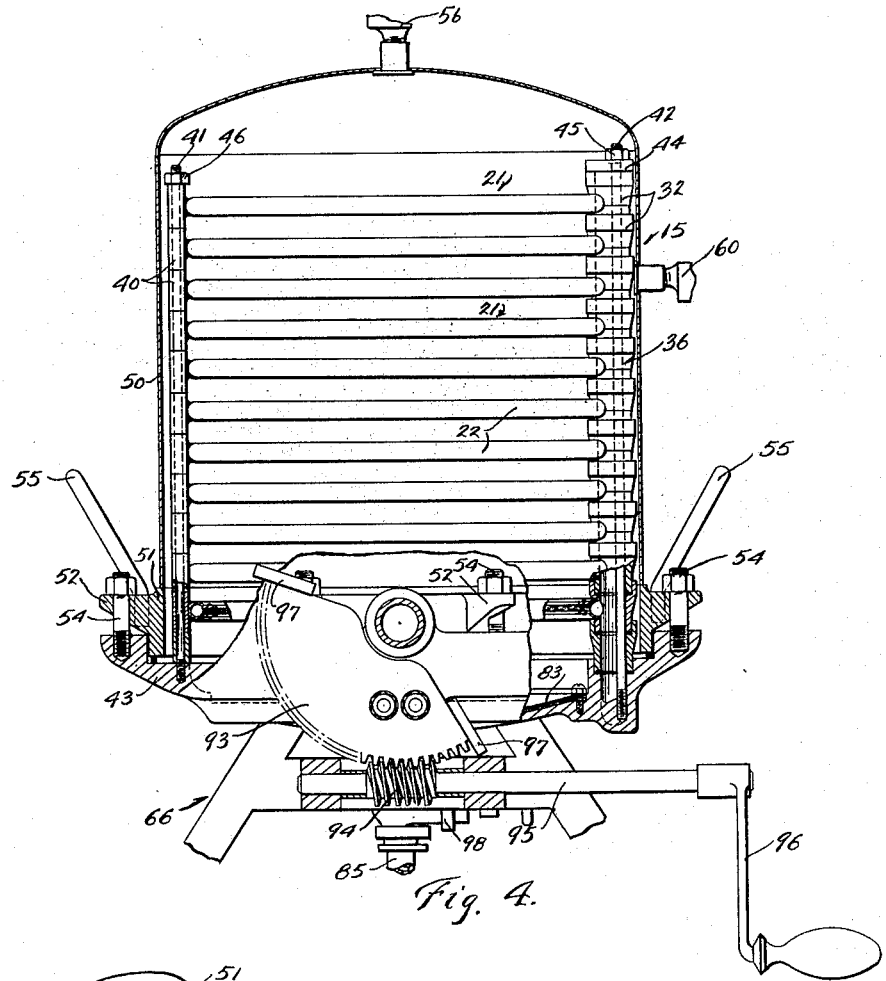
Fig. 4 is a fragmentary sectional side elevation.
Fig. 11 is an enlarged view of the dome fastening means.

While these filters may have a perimeter of any desired shape, I have found it preferable to make them of annular formation. An annular tube 22 of circular cross section is, therefore, provided at the perimeter of each filter leaf and each tube is formed with flanges 23 arranged in spaced relation with each other for the reception of the usual metal screens 24 and the interposed drainage member 25. The two screens 24 and drainage member are secured between the flanges 23 preferably by a plurality of rivets or other suitable fastening means passing therethrough. In the form of invention shown in Fig. 9, an imperforate plate 30 is arranged at one side of the drainage member 25 for reasons to be hereinafter described. Each of the tubes 23 forming the perimeter of the filter leaf is cut away at one point in its periphery and a leaf outlet hub 32 is secured thereto. Each of these fittings is formed at one end with a reduced portion 33 at one end thereof and with an enlarged portion 34 at the opposite end and formed with a recess 35 for the reception of the reduced portion 33 of an adjacent hub, whereby when assembled an outlet manifold 36 is provided for the filter leaves. In order to rigidly hold the assembled filter leaves in registering positions, a spacer 40 is secured to the tube 22 at a point opposite the outlet hub 32. Each of the spacers is provided with a central aperture through which a guide rod 41 is passed. In order to hold the outlet hubs of the assembled leaves in position, a support rod 42 is passed through the hub members. The rods 41 and 42 are extended downwardly below the last filter leaf and are screw-threaded into the head 43 of the filter. A manifold plug 44 (see Fig. 4) is disposed on the top of the outlet hub 32 of the upper filter leaf, through which the support rod 42 is passed, a nut 45 being secured at the upper end of the rod, whereby the assembled outlet hubs may be firmly drawn together in fluid sealing relationship. A nut 46 is secured to the top of the guide rod 41 whereby the spacers 40 may be tightly drawn together.

A dome 50 is carried by the head 43 and is formed at its lower end with a flange 51 which is provided with a plurality of clamping lugs 52 each formed with an open slot 53 for engagement with one of the fastening studs 54 carried by the head 43. Engagement of the slots 53 with the studs is brought about by a rotary movement of the dome upon the head. Suitable handles 55 are provided, one preferably at each of two opposite sides thereof whereby the dome may be conveniently handled. The dome is formed with a vent cock 56 disposed at the upper end thereof and with a vent cock 60 disposed in the side thereof which is uppermost when the filter is in a horizontal position.

The head 43 of the filter is formed with trunnion bearings 61 and 62 mounted in suitable bearing blocks 63 and 64, respectively. These bearing blocks are secured to the opposite cross members 65 of the frame 66 of the device. The trunnions 61 and 62 as well as the respective engaging bearing blocks 63 and 64 are provided with registering passageways 70 and 71, and 72 and 73, respectively, for the passage of the liquid being filtered. The head 43 of the filter is provided with an inlet passageway 74 which connects the inlet passageways 72 and 73 of the trunnion and associated block, respectively, with the interior of the dome 50. The head is, furthermore, provided with an outlet passageway 75 which registers with passageway of the manifold 36 and which is connected to the outlet passageways 70 and 71 of the trunnion bearing and associated block, respectively, by means of a passageway 76 formed in the head.

Obviously, as the liquid flows into the dome it will pass through the screens of each filter leaf and the filter cakes which may be disposed thereon, flowing radially between the screens to the annular tube 22 and therethrough to the outlet hub of the screens. From the manifold 36 formed by the interconnected outlet hubs, the fluid will flow to the outlet passage 75 and hence through the passageway 76 to the passageways 70 and 71 of the trunnion 61 and 71 of the bearing block 63, respectively. Each of the trunnion blocks 63 and 64 is provided with a threaded extension 86 and 90, respectively, for connection to inlet and outlet pipe 91 and 92, respectively, to be hereinafter described.

The bottom wall 80 of the head 43 is preferably concave and is provided with a central drainage opening 81 for the recovery of the liquid remaining in the filter after filtering process through the filter leaves has been completed. Extended over the concave bottom of the head is a drainage member 82 over which is extended a screen 83. The drainage member and screen are secured in place by means of a plurality of screws 84. The outlet passageway 81 of the head is suitably connected to a flexible conduit 85 having a valve 98 connected therein.

Suitable means are provided for tilting the filter 15 and may comprise a worm gear sector 93, which is suitably secured to the head 43 preferably adjacent the trunnion bearing 62 and a worm 94 mounted upon an operating shaft 95 and engaging the sector. By rotating the shaft through the medium of an attached crank 96, the sector may be operated to tilt the filter. A stop 97 is provided at each side of sector for contact with a suitable stationary part of the structure for limiting the tilting movement of the filter.

The pump 20, which for illustrative purposes, is shown as of the centrifugal type, is driven preferably by means of an electric motor 100 receiving its current from a suitable electric conductor 102 through switch means 101. The device is provided with a fluid inlet pipe 103 having a suitable valve 104 therein and connected to the suction side of the pump by means of suitable piping 105. The outlet side of the pump is connected to the threaded connection 90 of the trunnion bearing block 64 by means of suitable piping 106 in which is provided a valve 110. The outlet pipe 91 coming from the filter and carried by the extension 86 of the trunnion block 63 is connected to the outlet pipe 111 by means of piping 112. A valve 113 is provided in the outlet pipe 111 and a valve 114 is connected in the piping 112. The outlet pipe 111 is preferably connected to the piping 112 by means of a cross fitting 115 to one side of which the flexible outlet pipe 85 is connected. Connecting the lower end of the cross fitting with the piping 105 is a pipeline 116 in which a valve 120 is located. The piping 105 is preferably also connected to the outlet 121 of the mix tank 16 by means of a pipeline 122, a valve 123 being located in this pipeline.

The bearing block 63 is preferably provided with a test cock 124 which has an outlet 125, whereby samples of the filter liquid may be taken at any stage in the filtering process.

Figure 8:
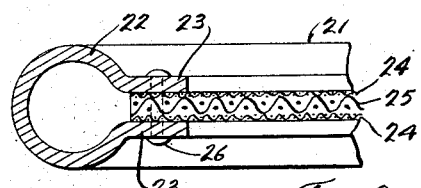
Fig. 8 is an enlarged fragmentary sectional view of one of the filtering leaves of my device.
Figure 9:
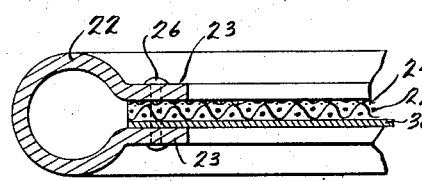
Fig. 9 is a similar view of a filtering leaf having an imperforate plate at one side thereof.

When my filter is to be used, the liquid is conducted by suitable piping (not shown) to the inlet pipe 103, and valves 104 and 123 having been opened, a predetermined amount of fluid is allowed to flow into the mix tank 16. When the correct amount of liquid has entered the tank, the valve 104 is shut off. The correct amount of filter aid is now added to and mixed with the liquid within the tank. Valve 110 is now opened and valves 120 and 114 are closed. The electric motor 100 is then energzed through the medium of the switch 101 causing the pump to be operated. Fluid is now pumped from the mix tank into the filter 15, air being vented from the dome 50 thereof through vent cocks 56 and 60, and when fluid in the tank has been pumped into the filter, the valve 123 is closed. If double screen filter leaves are being used, such as illustrated in Fig. 8, the filter is preferably tilted so that the leaves thereof are in vertical arrangement. The pre-coating of the leaves and the recovery screen 83 is accomplished by recirculating the liquid charged with the filter aid through the screens of the filters. To accomplish this the valves 98, 114, and 120 are opened while the valve 110 remains open. When the filter cakes are built up sufficiently as indicated by samples of the filtered liquid taken from the filter through the test cock 24, valve 104 will again be opened and valve 113 will be opened for conducting the clarified fluid from the filter to the place of storage through suitable piping (not shown) connected to the outlet pipe 111. Valve 98 is closed during the major filtering process. The liquid as it is being filtered passes through the coated screens of the filter leaves, leaving the solids deposited upon the outer surfaces of the leaves or filter aid deposited thereon. The clarified liquid will be collected in the tubes 22 whence it will be conducted to the manifold 36 and through passageways 75 and 76 to the piping 112 and through open valves 114 and 113 to the outlet pipe 111. When the filtering process has been completed, there will remain in the lower curved portion of the dome a quantity of unfiltered liquid. In order to filter this remaining liquid, the filter is rotated so as to occupy a vertical position, and the liquid will then pass through the recovery screen 83 and be conducted out through the outlet 81, through the valve 98, which is now open, and through the flexible hose 85 to the T-fitting 115 and thence out through the outlet pipe 111, the valve 114 having been previously closed. In order to facilitate the passage of the remaining liquid through the recovery screen 83, suitable gas or air under pressure may be conducted to the dome by a suitable conduit (not shown) being connected preferably to the vent cook 56. Such air or gas may also be used to dry the recovered solids. When my device is to be used for the recovery of solids suspended in a liquid, the filter leaves having but one screen with an impervious metal plate at the other side, as shown in Fig. 9 are used and the filter is tilted to its vertical position. Liquid will thereby flow over the top of the filter leaves depositing the solids upon the screen or previously formed filter cake. When the filtering process has been completed and the solids have been recovered from the liquid, it will be obvious that by removing the dome by loosening the nuts carried by the studs 54 and tilting the filter in a horizontal position, the cakes of solids deposited upon the leaves may be readily removed with the aid of suitable implements without disassembling the device. When it is desired to clean the filter, it is only necessary to remove the dome and the nuts 45 and 46 at the upper end of the support and guide rods 42 and 41, respectively, after which the filters may be disassembled and removed from the rods by vertical movement.

What is claimed is:

1. A filter having a plurality of spaced separable filter leaves, each filter leaf having spaced filtering elements, and a tubular member at the perimeter thereof for enclosing the edges of said elements, said member being in open communication with the space between said elements, an outlet hub secured to each of said filter leaves and having axial passageway normal to the filtering elements and opening into said tubular member, a filter head for supporting said filter leaves, means for detachably securing said leaves to said head, closure means removably carried by said head for encasing said filter leaves in liquid-tight manner, ported trunnion bearings for said head arranged to permit rotation thereof about an axis transverse to said passageway, liquid inlet and outlet passageways permanently connected to said ported trunnion bearings, said filter elements being exposed to the unfiltered liquid entering said closure through one of the trunnion ports, and means connecting said outlet hubs to the other trunnion port for conducting the filtered liquid to the outlet of the device.

2. A filter having a plurality of spaced separable filter leaves, each filter leaf having spaced filtering elements, a tubular member at the perimeter thereof for enclosing the edges of said elements, said member being in open communication with the space between said elements, an outlet hub secured to each of said filter leaves and having an axial passageway normal to the filtering elements and opening into said tubular member, a filter head for supporting said filter leaves, means for detachably securing said leaves to said head, closure means removably carried by said head for encasing said filter leaves in liquid-tight manner, ported trunnion bearings for said head arranged to permit rotation thereof about an axis transverse to said passageway, liquid inlet and outlet passageways permanently connected to said ported trunnion bearings, said filter elements being exposed to the unfiltered liquid entering said closure through one of the trunnion ports, means connecting said outlet hubs to the other trunnion port for conducting the filtered liquid to the outlet of the device, and means for tilting said filter head about said trunnion bearings.

3. A filter having a plurality of spaced separable filter leaves, each filter leaf having a filter screen, an imperforate plate in spaced relation with said screen, and a tubular member at the perimeter of said screen and plate for enclosing the edges thereof, said member being in open communication with the space between said screen and said plate, an outlet hub secured to each of said filter leaves and having an axial passageway normal to the plane of the filter leaf and opening into said tubular member, a filter head for supporting said filter leaves and formed with suitable fluid inlet and outlet passageways, means for detachably securing said leaves to said head, and closure means removably carried by said head for encasing said filter leaves in liquid-tight manner.

4. A filter leaf comprising a filter screen, an imperforate plate in spaced relation with said screen, a tubular member at the perimeter of said leaf for enclosing the edges of said screen and said plate, said member being in open communication with the space between said screen and said plate, an outlet hub secured to the periphery of said member and having an axial passageway normal to the plane of said member, and a spacer secured to said member at a point opposite said hub and having its axis normal to the plane of said member.

RAYMOND G. TESSMER.

REFERENCES CITED

The following references are of record in the file of this patent:

UNITED STATES PATENTS

| Number | Name | Date |
|---|---|---|
| 517,240 | Roger | Mar. 27, 1894 |
| 555,855 | Fleetwood | Mar. 3, 1896 |
| 617,029 | Koneman et al. | Jan. 3, 1899 |
| 774,349 | Cassel | Nov. 8, 1904 |
| 998,815 | Uhlmann | July 25, 1911 |
| 1,013,761 | Gavelack | Jan. 2, 1912 |
| 1,043,455 | Neil | Nov. 5, 1912 |
| 1,305,317 | Sweetland | June 3, 1919 |
| 1,670,319 | Sweetland | May 22, 1928 |
| 1,746,409 | Sweetland et al. | Feb. 11, 1930 |
| 1,768,167 | Sweetland | June 24, 1930 |
| 1,867,397 | Brace et al. | July 12, 1932 |
| 1,871,870 | Wood et al. | Aug. 16, 1932 |
| 1,919,448 | Norquist et al. | July 25, 1933 |
| 2,013,776 | Wiesman | Sept. 10, 1935 |
| 2,035,851 | Walker | Mar. 31, 1936 |
| 2,044,096 | Moran | June 16, 1936 |
| 2,221,210 | Soderquist | Nov. 12, 1940 |
| 2,240,793 | Marvel | May 6, 1941 |
| 2,278,453 | Kracklauer | Apr. 7, 1942 |
| 2,300,789 | Kelley | Nov. 3, 1942 |
| 2,327,803 | Kidd | Aug. 24, 1943 |
| 2,328,148 | Jacobowitz | Aug. 31, 1943 |
| 2,381,453 | Hunziker | Aug. 7, 1945 |
| 2,381,462 | Naugle | Aug. 7, 1945 |